(12) United States Patent
Hou et al.

(10) Patent No.: US 11,802,450 B2
(45) Date of Patent: Oct. 31, 2023

(54) NEGATIVE PRESSURE SHALE SHAKER INTEGRATED WITH NEGATIVE PRESSURE GENERATION AND GAS-LIQUID SEPARATION

(71) Applicant: Southwest Petroleum University, Chengdu (CN)

(72) Inventors: Yongjun Hou, Chengdu (CN); Yuwen Wang, Chengdu (CN); Pan Fang, Chengdu (CN); Mingjun Du, Chengdu (CN); Duyu Hou, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 135 days.

(21) Appl. No.: 17/445,731

(22) Filed: Aug. 24, 2021

(65) Prior Publication Data
US 2022/0307336 A1    Sep. 29, 2022

(30) Foreign Application Priority Data
Mar. 24, 2021 (CN) .......................... 202110311176.9

(51) Int. Cl.
| | | |
|---|---|---|
| *E21B 21/06* | (2006.01) | |
| *B01D 21/00* | (2006.01) | |
| *B01D 21/24* | (2006.01) | |
| *B01D 21/28* | (2006.01) | |

(52) U.S. Cl.
CPC ........ *E21B 21/065* (2013.01); *B01D 21/0012* (2013.01); *B01D 21/2444* (2013.01); *B01D 21/283* (2013.01); *E21B 21/067* (2013.01)

(58) Field of Classification Search
None
See application file for complete search history.

(56) References Cited

FOREIGN PATENT DOCUMENTS

| CN | 207787043 U | * | 8/2018 |
|---|---|---|---|
| CN | 110578484 A | * | 12/2019 |

\* cited by examiner

*Primary Examiner* — Bradley R Spies
*Assistant Examiner* — Jeannie McDermott
(74) *Attorney, Agent, or Firm* — Bayramoglu Law Offices LLC

(57) ABSTRACT

A negative pressure shale shaker integrated with negative pressure generation and gas-liquid separation includes a base, a liquid inlet buffer tank, a screen frame assembly, a support frame, a vacuum hose, a damping spring, a screen frame inclination angle adjustment device, a drainage hose, a negative pressure automatic drainage device, a vacuum pan, a three-way pipe, a liquid mist separator, a connecting pipe, a vacuum pressure limiting valve, a silencer and a negative pressure fan. A drilling fluid containing cuttings, after entering the screen with a negative pressure thereunder, rapidly passes through the screen along with air into a vacuum chamber. The air in the vacuum chamber is directly drawn away through holes formed on the side plates of the screen frame by the negative pressure fan.

9 Claims, 5 Drawing Sheets

NEGATIVE PRESSURE SHALE SHAKER INTEGRATED WITH NEGATIVE PRESSURE GENERATION AND GAS-LIQUID SEPARATION

CROSS REFERENCE TO THE RELATED APPLICATIONS

This application is based upon and claims priority to Chinese Patent Application No. 202110311176.9, filed on Mar. 24, 2021, the entire contents of which are incorporated herein by reference.

TECHNICAL FIELD

The present invention relates to the technical field of solids control in oil drilling, and specifically relates to a negative pressure shale shaker integrated with negative pressure generation and gas-liquid separation.

BACKGROUND

Existing solids control technology for oil drilling generally uses vibrating screening to remove most of the drill cuttings that are contained in the drilling fluid returned from the downhole. The subsequent environmental-friendly treatment of these drill cuttings with a high liquid content entails a heavy workload and is thus costly. The prior art has disclosed a vacuum filtration-based drilling fluid solid-liquid separation equipment with continuous-loop meshes, whereby the volumetric liquid content of the separated drilling cuttings can be reduced to below 40%. The prior art has further disclosed a pulsed-vacuum assisted drilling fluid separation device, where a vacuum pan is installed under a first screen at the outlet end of a traditional shale shaker, and a pulsed vacuum is generated by using the pulse jet of compressed air to dry the drill cuttings to be discharged on the screen, in such a way the volumetric liquid content of the dried drill cuttings can also be reduced to below 40%.

The vacuum filtration-based drilling fluid solid-liquid separation equipment has a complex structure, a high cost, a short screen lifespan, and a high power consumption. When a vacuum is generated by using jets of compressed air on a traditional shale shaker, it will consume a substantial amount of compressed air and thus cost more. Additionally, when a negative pressure is generated, the suctioned drilling fluid and the air are mixed into a gas-liquid separation system for gas-liquid separation to prevent the air from being immersed in the drilling fluid. The vacuum suction method requires a large-sized gas-liquid separation system and has low separation efficiency. In this case, the vacuum that can be achieved is relatively low due to the height limitation of the separation system. In the compressed air jet-based method, a higher degree of vacuum can be generated, but liquid mist is likely to occur after the air and the drilling fluid are mixed, and there exists a significant safety hazard during the use of oil-based drilling fluid.

In order to overcome the shortcomings of the prior art, it is highly desirable to provide a negative pressure shale shaker integrated with negative pressure generation and gas-liquid separation.

SUMMARY

An objective of the present invention is to provide a negative pressure shale shaker integrated with negative pressure generation and gas-liquid separation to overcome the following shortcomings: the liquid content of drill cuttings discharged by traditional shale shakers is high, the vacuum filtration-based drilling fluid solid-liquid separation equipment is expensive and has a short screen lifespan, and the gas-liquid separation system of existing negative pressure shale shakers is large in size and low in efficiency.

To resolve the above-mentioned technical problems, the present invention adopts the following technical solution.

A negative pressure shale shaker integrated with negative pressure generation and gas-liquid separation includes a screen frame assembly that is internally provided with a screen and installed on a base, a liquid mist separator, a negative pressure automatic drainage device, and a vacuum pan disposed under the screen frame assembly. The screen frame assembly is provided with a vertical channel, a horizontal channel and a connector connected at the middle portion of the horizontal channel. The bottom end of the vertical channel communicates with the vacuum pan, and the horizontal channel communicates with adjacent vertical channels. The horizontal channel inclines downward from the connector to both ends such that a drilling fluid in the horizontal channel flows back to the vertical channel. The connector communicates with the liquid mist separator through a vacuum hose and a three-way pipe. The vacuum pan and the negative pressure automatic drainage device are communicated through a drainage hose disposed therebetween. In the screen frame assembly, the lower side of the screen is provided with a closed structure, the closed structure discharges the drilling fluid through the drainage hose, and gas is discharged through the vertical channel, so as to implement negative pressure generation and gas-liquid separation. In this way, the negative pressure generation and the gas-liquid separation are both integrated in the vacuum pan.

In a preferred embodiment of the present invention, the negative pressure shale shaker further includes a negative pressure fan and a connecting pipe connecting an inlet of the negative pressure fan and an outlet of the liquid mist separator. A vacuum pressure limiting valve for adjusting a negative pressure is disposed on the connecting pipe. A silencer is disposed at an outlet of the negative pressure fan. In this arrangement, for an oil-based drilling fluid, the discharged air is well purified, the safety is high, and the noise is reduced.

In a preferred embodiment of the present invention, the negative pressure shale shaker works in a negative pressure mode or a regular mode. When the negative pressure fan is started, the negative pressure shale shaker works in the negative pressure mode, the gas passes through the vertical channel, the horizontal channel, the vacuum hose and the three-way pipe and then is discharged by the negative pressure fan through the liquid mist separator, and meanwhile, the drilling fluid passes through the screen and the vacuum pan and then is discharged into the negative pressure automatic drainage device through the drainage hose. When the negative pressure fan is shut down, the negative pressure shale shaker works in the regular mode, and only the drilling fluid is discharged into the negative pressure automatic drainage device. In this way, it is convenient for not only the rapid separation of solid-liquid or solid-liquid-gas, but also for switching in different working modes.

In a preferred embodiment of the present invention, the negative pressure automatic drainage device includes an inlet connector disposed on a lower casing, an upper cover plate, an intermediate partition, a lower casing, a wedge mount, a lower casing with an L-shaped cross-section, a screw rod, a nut and a hand wheel. The upper cover plate closes the lower casing on the base. The intermediate partition is connected to the bottom of the upper cover plate and divides the lower casing into two parts. The base is provided with a first through hole connected to the lower casing. A gap with a height of H is formed between the intermediate partition and an inner wall of the lower casing. A panel of the liquid baffle is attached to the first through hole. The panel of the liquid baffle is provided with a second through hole having a size smaller than the size of the first through hole. The height of the second through hole is greater than H. The wedge mount is disposed at both sides of the first through hole of the base. Both sides of the liquid baffle are clamped into the wedge mount. The bottom end of the screw rod is connected to the liquid baffle and drives the liquid baffle to move up and down. The top end of the screw rod is fixed on the base through the nut and the hand wheel.

In a preferred embodiment of the present invention, the at least one vacuum pan is connected to the lower casing of the negative pressure automatic drainage device through the drainage hose. Optionally, a plurality of vacuum pans can be used simultaneously to expand the liquid capacity of the vacuum pans and enhance processing efficiency.

In a preferred embodiment of the present invention, one vacuum pan is disposed under the at least one screen. When a plurality of screens are provided, the plurality of screes share or each use one vacuum pan. High-mesh-count screens can be used to greatly reduce the workload of downstream solids control equipment. The plurality of screens can be used in conjunction with the vacuum pans, where the number of screens and the number of vacuum pans are highly compatible, thereby improving processing efficiency.

In a preferred embodiment of the present invention, the negative pressure shale shaker further includes a damping spring and a screen frame inclination angle adjustment device installed on the base. The damping spring connects the screen frame assembly to the top of the screen frame inclination angle adjustment device such that the screen frame assembly can adjust the inclination angle relative to the base.

In a preferred embodiment of the present invention, the screen frame assembly further includes a rear baffle, a right side plate, a transverse beam, a motor base, a vibration motor, a spring base, a left side plate and a screen tensioning device. The rear baffle connects the right side plate and the left side plate. The transverse beam connects the right side plate and the left side plate. The motor base is fixedly connected to the right side plate and the left side plate. The vibration motor is installed on the motor base. The spring base is fixed to the right side plate and the left side plate. The screen tensioning device fixes the screen to the right side plate and the left side plate, to form a working region in which the negative pressure shale shaker separates the drilling fluid and the drill cuttings.

In a preferred embodiment of the present invention, a U-shaped vertical plate is connected to the right side plate or the left side plate to form the vertical channel. A U-shaped transverse plate is connected to the right side plate or the left side plate to form the horizontal channel. The gas flows through and the drilling fluid flows back inside the vertical channel and the horizontal channel.

In a preferred embodiment of the present invention, the negative pressure shale shaker further includes a liquid inlet buffer tank and a support frame installed on the base. The interior of the liquid inlet buffer tank communicates with the upper portion of the screen such that the drilling fluid can easily flow into the screen. The liquid mist separator and the negative pressure fan are installed at the top of the support frame.

The present invention has the following advantages.

(1) The shale shaker of the present invention has a large processing capacity, reaching more than 2 times that of a conventional shale shaker under the same conditions. (2) The liquid content of the discharged drill cuttings is significantly reduced, where the liquid content of drill cuttings of water-based drilling fluid is reduced by more than 30% than a conventional shale shaker, and the liquid content of drill cuttings of oil-based mud is reduced by more than 40%. (3) The workload of downstream solids control equipment can be significantly reduced by using high-mesh-count screens. (4) The screen has a long lifespan. (5) The screen has a high conductance for high-viscosity drilling fluid. (6) Negative pressure generation and gas-liquid separation are both integrated in the vacuum pan, and a high negative pressure is generated to be highly adaptive to facilitate the gas-liquid separation. (7) For the oil-based drilling fluid, the discharged air is well purified, which has high safety. (8) The cost is low, and the power consumption is small.

BRIEF DESCRIPTION OF THE DRAWINGS

In order to illustrate the technical solution of the embodiments of the present invention more clearly, the drawings used in the embodiments will be introduced briefly below. It should be understood that the following drawings merely illustrate some of the embodiments of the present invention, and thus should not be regarded as limitations to the scope.

Figure 1:
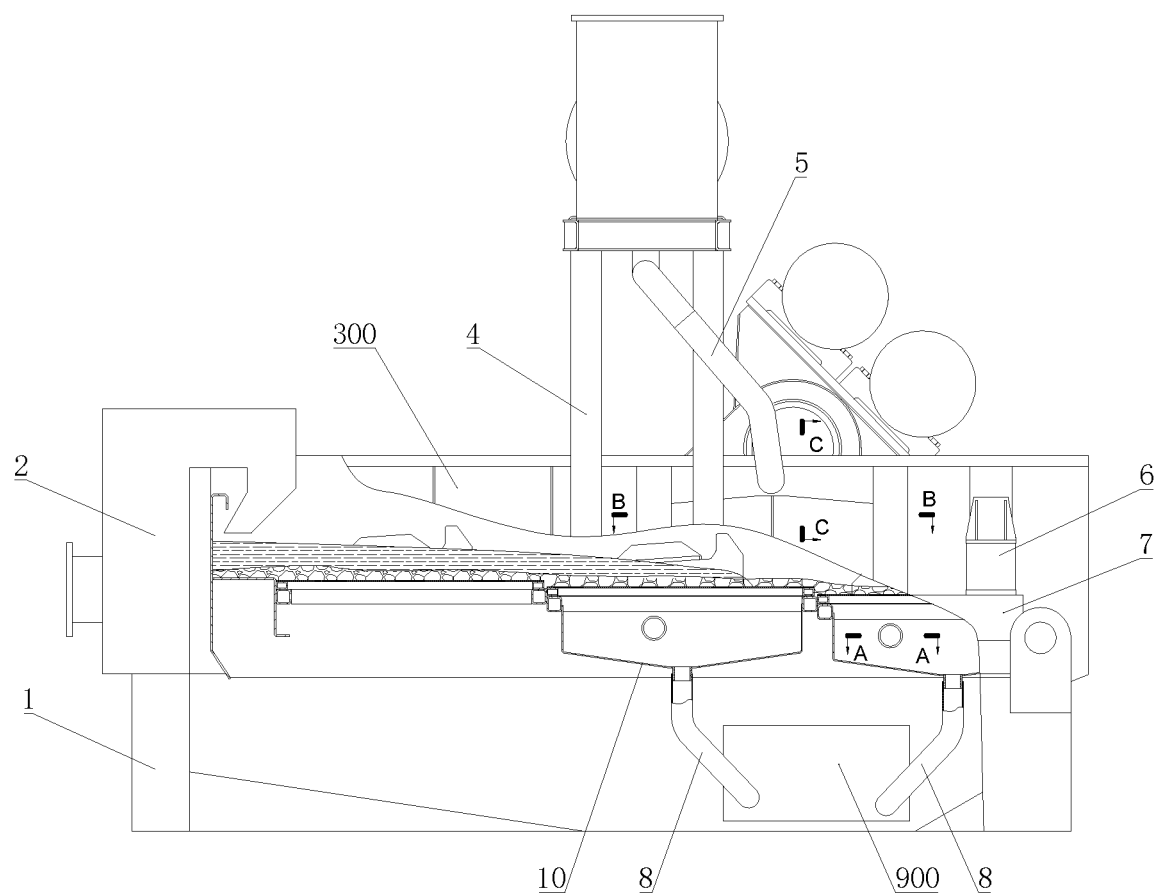
FIG. 1 is a main view of the negative pressure shale shaker integrated with negative pressure generation and gas-liquid separation of the present invention.

Reference numerals: 1—base, 2—liquid inlet buffer tank, 300—screen frame assembly, 301—rear baffle, 302—right side plate, 303—screen, 304—transverse beam, 305—U-shaped vertical plate, 306—U-shaped transverse plate, 307—connector, 308—motor base, 309—vibration motor, 310—spring base, 311—left side plate, 312—screen tensioning device, 4—support frame, 5—vacuum hose, 6—damping spring, 7—screen frame inclination angle adjustment device, 8—drainage hose, 900—negative pressure automatic drainage device, 901—inlet connector, 902—upper cover plate, 903—intermediate partition, 904—lower casing, 905—wedge mount, 906—liquid baffle, 907—screw rod, 908—nut, 909—hand wheel, 910—first through hole, 911—second through hole, 10—vacuum pan, 11—three-way pipe, 12—liquid mist separator, 13—connecting pipe, 14—vacuum pressure limiting valve, 15—silencer, 16—negative pressure fan.

DETAILED DESCRIPTION OF THE EMBODIMENTS

In order to clarify the objective, technical solutions and advantages of the present invention, the technical solutions in the embodiments of the present invention will be clearly and completely described in conjunction with the drawings in the embodiments of the present invention. Obviously, the described embodiments are only a part of the embodiments rather than all of the embodiments of the present invention. Herein, the components of the embodiments of the present invention described and illustrated in the drawings can be generally arranged and designed with different configurations.

Thus, the detailed description of the embodiments of the present invention provided in the drawings hereinafter does not aim to limit the scope claimed by the present invention, but merely represents the preferred embodiments of the present invention. Based on the embodiments of the present invention, all other embodiments obtained by those ordinarily skilled in the art without creative efforts shall fall within the scope of protection of the present invention.

Embodiments

Referring to FIG. 1, a negative pressure shale shaker integrated with negative pressure generation and gas-liquid separation, includes the base 1, the liquid inlet buffer tank 2, the screen frame assembly 300, the support frame 4, the vacuum hose 5, the damping spring 6, the screen frame inclination angle adjustment device 7, the drainage hose 8, the negative pressure automatic drainage device 900, the vacuum pan 10, the three-way pipe 11, the liquid mist separator 12, the connecting pipe 13, the vacuum pressure limiting valve 14, the silencer 15, and the negative pressure fan 16. The screen frame assembly 300 includes the rear baffle 301, the right side plate 302, the screen 303, the transverse beam 304, the U-shaped vertical plate 305, the U-shaped transverse plate 306, the connector 307, the motor base 308, the vibration motor 309, the spring base 310, the left side plate 311 and the screen tensioning device 312. The negative pressure automatic drainage device 900 includes the inlet connector 901, the upper cover plate 902, the intermediate partition 903, the lower casing 904, the wedge mount 905, the liquid baffle 906, the screw rod 907, the nut 908 and the hand wheel 909. The negative pressure shale shaker conveys the drilling fluid to the screen 303 through the liquid inlet buffer tank 2. The drilling fluid and the drill cuttings are separated by the screen 303, and the drilling fluid enters the vacuum pan 10. The vacuum pan 10 and the negative pressure automatic drainage device 900 are communicated through the drainage hose 8 disposed therebetween. In the screen frame assembly 300, the lower side of the screen 303 is provided with a closed structure, and the closed structure discharges the drilling fluid into the negative pressure automatic drainage device 900 through the drainage hose 8. When the negative pressure fan 16 is started and after the air and the drilling fluid enter the vacuum pan 10 through the screen 303, a small amount of the drilling fluid forms liquid mist. The liquid mist is mixed with the air to enter the three-way pipe 11 through the vertical channel, which is formed by the U-shaped vertical plate 305 together with the right side plate 302 and the left side plate 311, and the horizontal channel, which is formed by the U-shaped transverse plate 306 together with the right side plate 302 and the left side plate 311, and then enter the liquid mist separator 12 for liquid mist separation, such that the separated gas passes through the connecting pipe 13 and then is discharged by the negative pressure fan 16, thereby implementing the negative pressure generation and the gas-liquid separation. In this way, the negative pressure generation and the gas-liquid separation are both integrated in the vacuum pan 10, the generated negative pressure is high and has strong adaptivity, and the gas-liquid separation effect is good.

Figure 2:
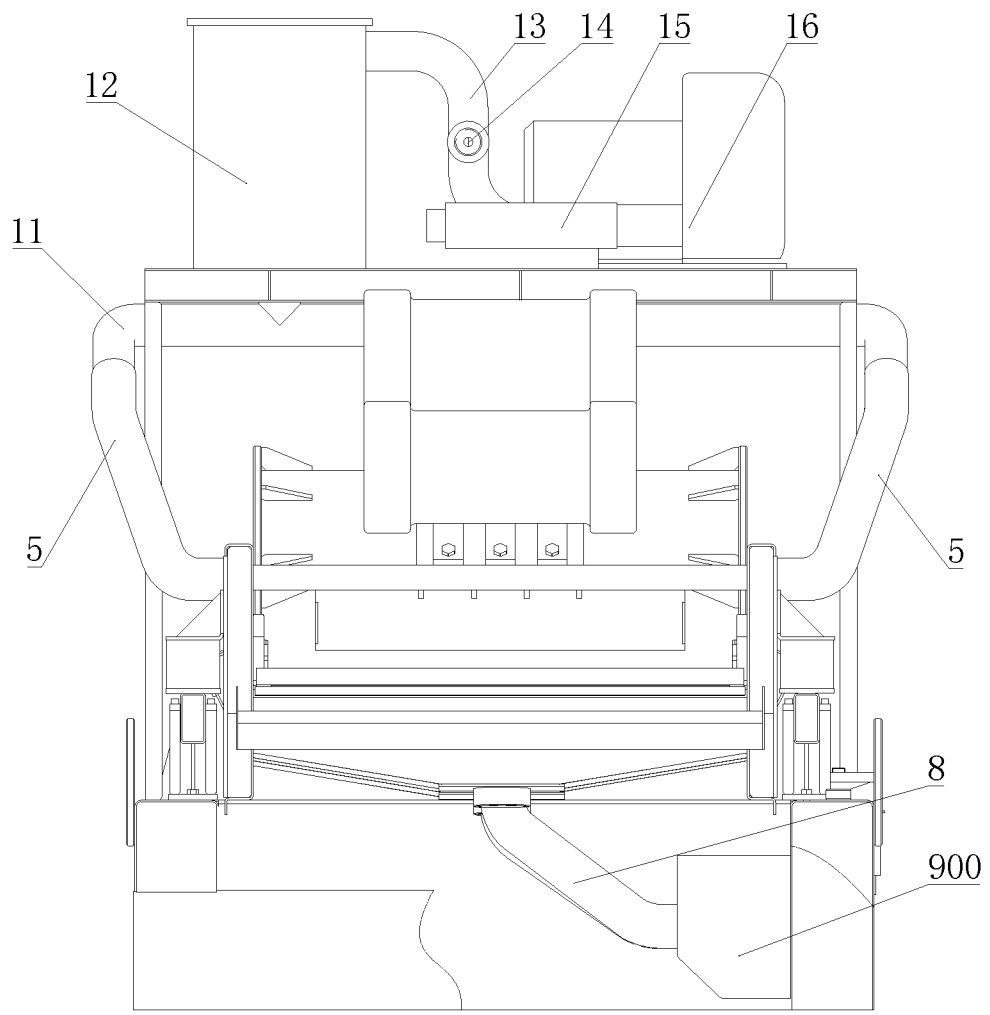
FIG. 2 is a right view of the negative pressure shale shaker integrated with negative pressure generation and gas-liquid separation of the present invention.

Referring to FIG. 2, in the present embodiment, the gas is pumped out from the vacuum pan 10 through the liquid mist separator 12 for liquid mist separation, and the gas is pumped through the negative pressure formed by the negative pressure fan 16. The bottom end of the support frame 4 is fixedly welded to the base 1 to facilitate the installation of the liquid mist separator 12 and the negative pressure fan 16. The top of the support frame 4 is fixed to the liquid mist separator 12 through a bolt. Both ends of the connecting pipe 13 are connected to the inlet of the negative pressure fan 16 and the outlet of the liquid mist separator 12, respectively. The vacuum pressure limiting valve 14 for regulating the negative pressure is disposed on the connecting pipe 13. The silencer 15 is fixed to the outer wall of a pipe at the outlet of the negative pressure fan 16 through a bolt. The negative pressure in the vacuum pan 10 is adjusted by the vacuum pressure limiting valve 14, and the generated negative pressure is high and has strong adaptability, and the gas-liquid separation effect is good. The noise produced during the gas pumping of the negative pressure fan 16 is reduced by the silencer 15. In this way, for the oil-based drilling fluid, the discharged air is well purified, which has high safety.

Figure 3:
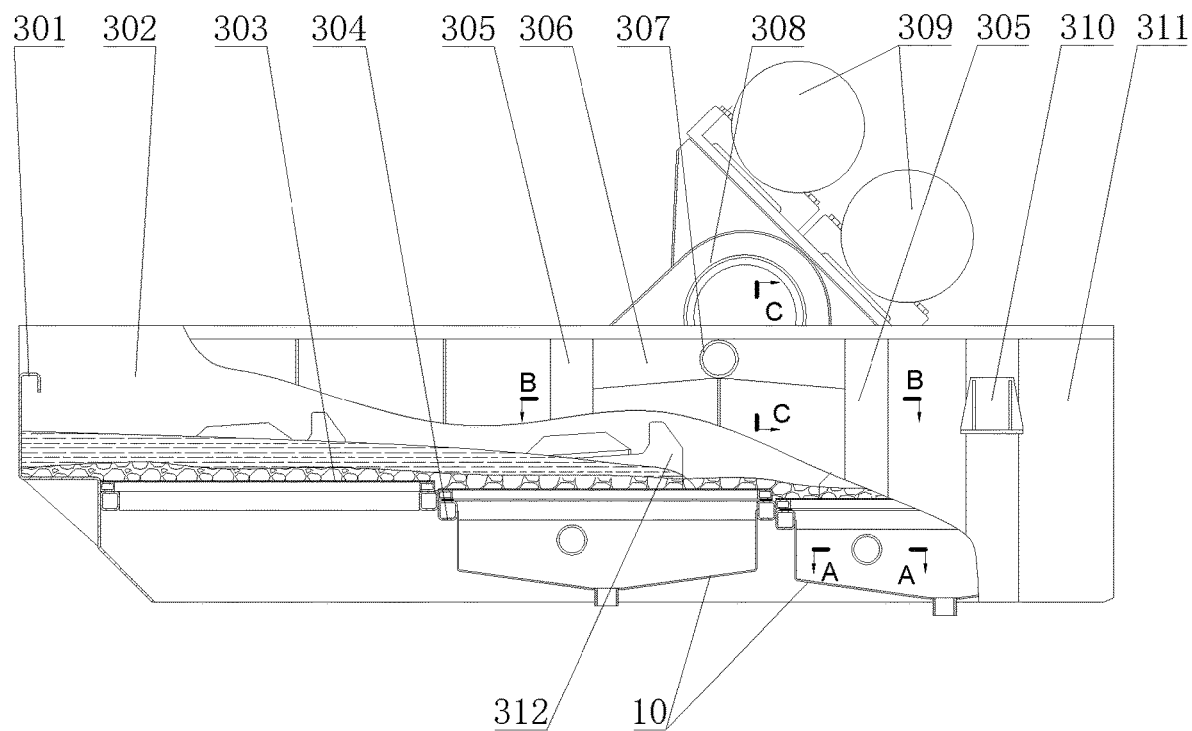
FIG. 3 is a schematic diagram of the screen frame assembly of the present invention.

Referring to FIG. 3, in the present embodiment, the connection or assembly relationship of part of the structures of the screen frame assembly 300 is the same as that of an existing shale shaker. Both ends of the rear baffle 301 are fixedly welded to the right side plate 302 and the left side plate 311, respectively, and both ends of the transverse beam 304 are welded to the inner walls of the right side plate 302 and the left side plate 311, respectively, so as to form a frame structure. The transverse beam 304 is located below the screen 303, and the screen 303 is arranged between the right side plate 302 and the left side plate 311. The screen 303 is fixed on the frame structure of the screen frame assembly 300 through the screen tensioning device 312, and the screen tensioning device 312 adjusts the degree of tension of the screen 303. The damping spring 6 is installed in a mounting groove disposed on the spring base 310. The spring base 310 is fixedly welded to the right side plate 302 and the left side plate 311. The liquid inlet buffer tank 2 is fixedly installed on the base 1, with an interior communicating with the upper portion of the screen 303. The drilling fluid enters from one end of the liquid inlet buffer tank 2, and then is discharged to the screen 303 from the other end, such that the drilling fluid can easily flow into the screen 303. The screen frame inclination angle adjustment device 7 is fixedly installed on the base 1 through a bolt. The bottom end of the damping spring 6 is fixedly connected to the screen frame inclination angle adjustment device 7. The inclination angle of the screen frame assembly 300 relative to the base 1 can be adjusted through the screen frame inclination angle adjustment device 7. The motor base 308 is fixedly welded to the right side plate 302 and the left side plate 311, the vibration motor 309 is installed on the motor base 308, and a vibration force generated when the vibration motor 309 is rotating drives the screen frame assembly 300 to vibrate forth and back, so as to form a working region in which the negative pressure shale shaker separates the drilling fluid and the drill cuttings.

The vacuum pan 10 is fixedly welded to the transverse beam 304, the right side plate 302 and the left side plate 311, respectively. The vacuum pan 10 vibrates with the screen frame assembly 300. One vacuum pan 10 is disposed under the at least one screen 303. When a plurality of screens 303 are provided, the plurality of screens 303 share one vacuum pan 10 or each use one vacuum pan 10. High-mesh-count screens 303 can be used to greatly reduce the workload of downstream solids control equipment. It needs to note that the manner in which the vacuum pan 10 is disposed under the screen 303 includes: disposing one vacuum pan under each screen 303, or disposing one vacuum pan under two adjacent screens 303, or sharing one vacuum pan under all the screens 303. When a plurality of vacuum pans 10 are disposed under the screens 303, respectively, all the vacuum pans 10 share one negative pressure automatic drainage device 900, or independently use one negative pressure automatic drainage device 900. The vacuum pan 10 can be disposed under each or part of the screens 303. When the vacuum pan 10 is disposed under part of the screens 303, the vacuum pan 10 is disposed under the screens 303 at an exhaust end. One vacuum pan 10 is disposed under each screen 303, or one vacuum pan 10 is disposed under two adjacent screens 303, or one vacuum pan 10 is shared under all the screens 303. In the present embodiment, two vacuum pans 10 are provided. The plurality of screens 303 are used in conjunction with the vacuum pans 10, and the number of screens 303 and the number of vacuum pans 10 are highly compatible. The two vacuum pans 10 are simultaneously connected to the lower casing 904 of the negative pressure automatic drainage device 900 through the drainage hose 8 to expand the liquid capacity of the vacuum pans 10 and enhance processing efficiency.

Figure 4:
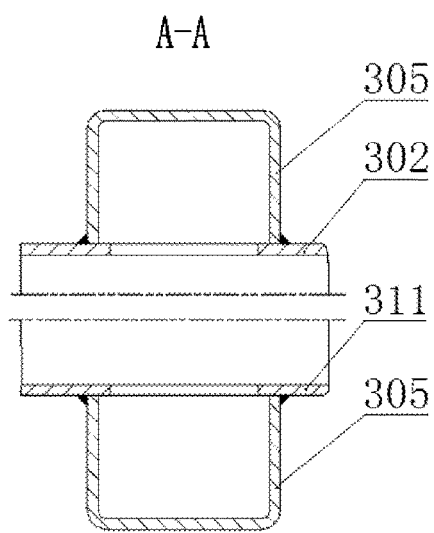
FIG. 4 is a cross-sectional view of the vertical channel taken along arrow A-A in FIG. 1 or FIG. 3 of the present invention.
Figure 5:
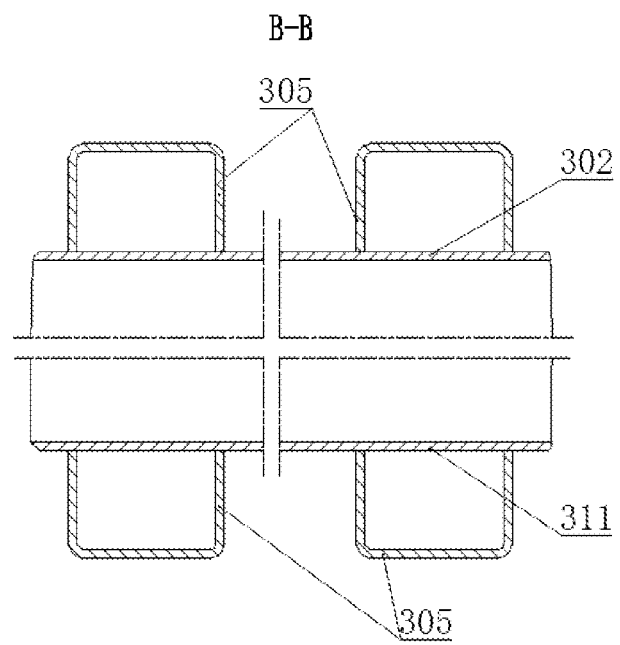
FIG. 5 is a cross-sectional view of the vertical channel taken along arrow B-B in FIG. 1 or FIG. 3 of the present invention.
Figure 6:
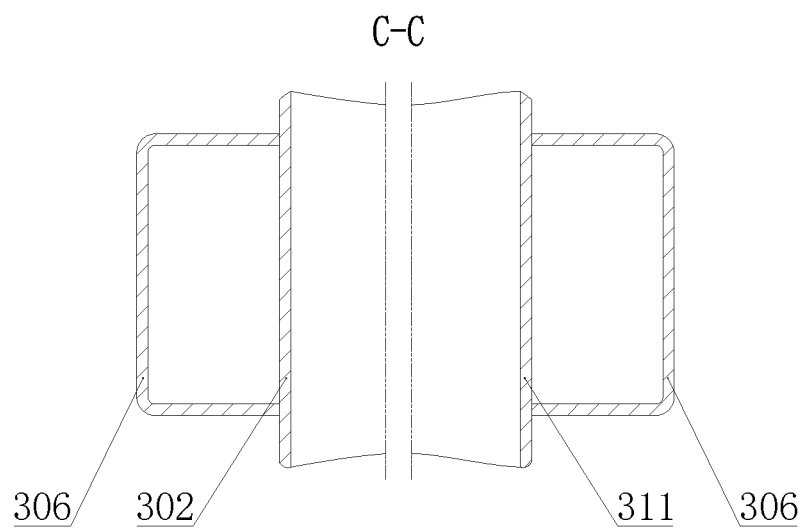
FIG. 6 is a cross-sectional view of the horizontal channel taken along arrow C-C in FIG. 1 or FIG. 3 of the present invention.

Referring to FIGS. 4, 5 and 6, in the present embodiment, four U-shaped vertical plates 305 are provided, and two U-shaped transverse plates 306 are provided. These plates are uniquely designed in structure. Specifically, the top of the U-shaped vertical plate 305 is closed. The U-shaped vertical plates 305 are welded to the right side plate 302 and the left side plate 311, respectively, to form the vertical channel. The gas and fluid flow through the U-shaped vertical plates 305. The U-shaped transverse plates 306 are welded to the right side plate 302 and the left side plate 311, respectively, to form the horizontal channel. The gas and fluid flow through the U-shaped transverse plates 306. The horizontal channel is inclined. The connector 307 is welded at the middle portion of the U-shaped transverse plate 306, and the U-shaped transverse plate 306 inclines downward from the connector 307 to both ends. Both ends of the U-shaped transverse plate 306 communicate with the adjacent U-shaped vertical plates 305, respectively, so that the drilling fluid in the U-shaped transverse plates 306 flows back to the U-shaped vertical plates 305. The vacuum pan 10 forms a chamber under the screen 303, and the chamber is provided with holes at the right side plate 302 and the left side plate 311. The bottom ends of the U-shaped vertical plates 305 are connected to the holes, and the chamber communicates with the vertical channels formed by the U-shaped vertical plates 305, the right side plate 302 and the left side plate 311 through the holes. Both ends of the vacuum hose 5 connect the connector 307 and the three-way pipe 11, respectively. The three-way pipe 11 have three connecting ends, where two ends of the three-way pipe 11 are connected to the connectors 307 located outside the right side plate 302 and the left side plate 311, respectively, while the third end of the three-way pipe 11 communicates with the liquid mist separator 12, so that the air and the liquid mist are concentrated to the liquid mist separator 12 through the three-way pipe 11 to be processed, thereby improving the processing capacity.

Figure 7:
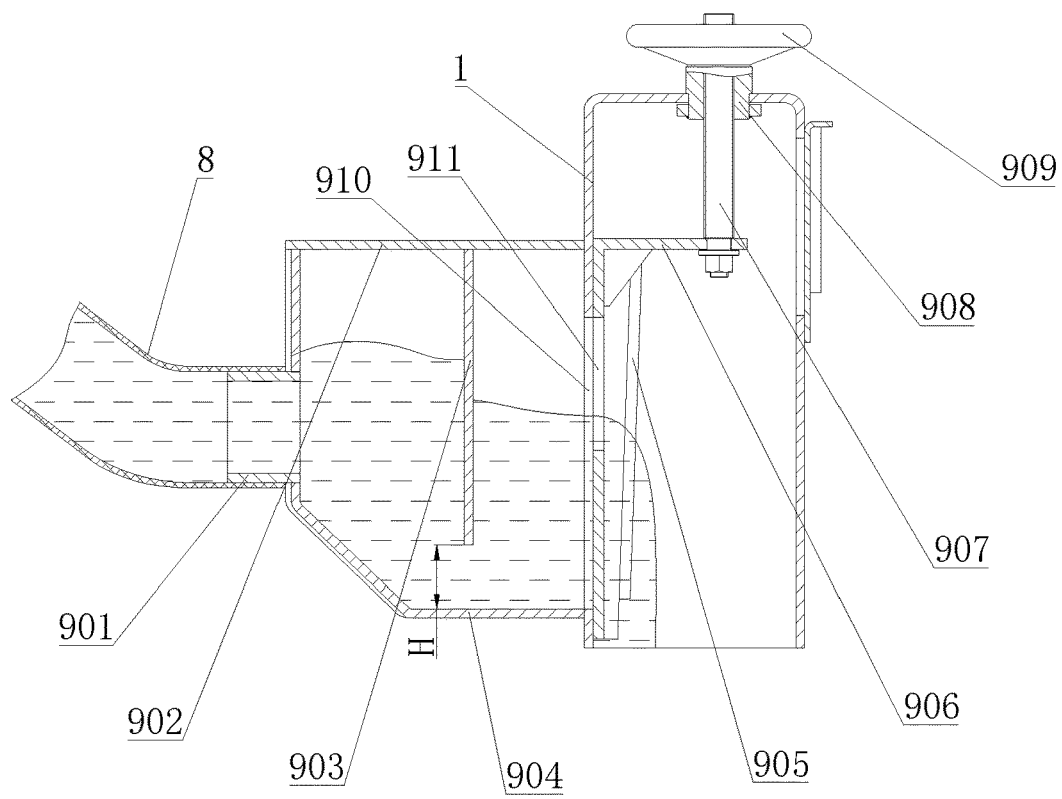
FIG. 7 is a cross-sectional view of the negative pressure automatic drainage device of the present invention.
Figure 8:
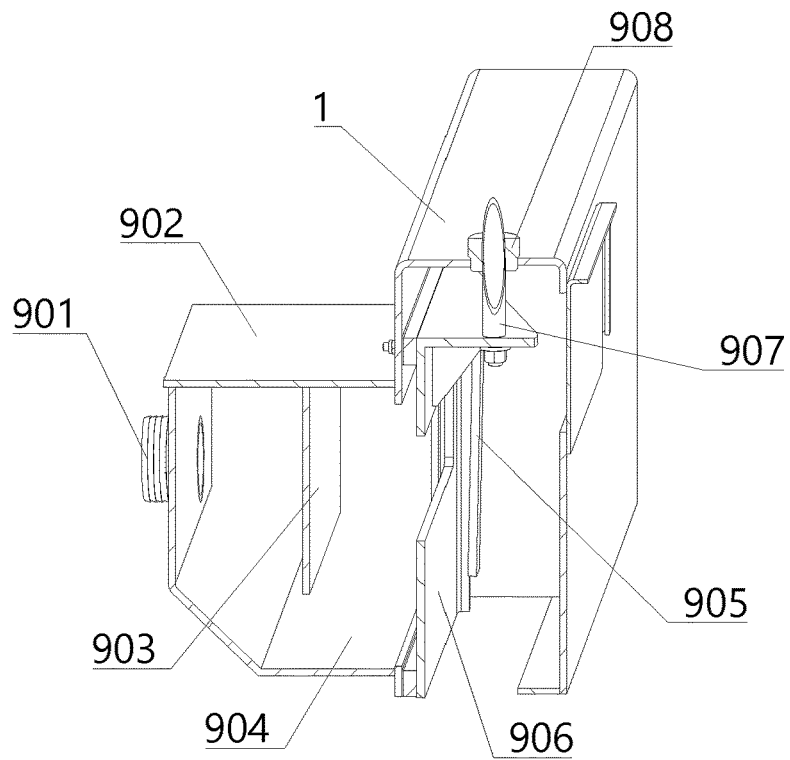
FIG. 8 is a perspective cross-sectional view of the negative pressure automatic drainage device of the present invention.

Referring to FIGS. 7 and 8, the negative pressure automatic drainage device 900 of the present embodiment automatically discharges the drilling fluid from which the drill cuttings have been screened out and ensures that the air will not be drawn into the vacuum pan 10 from the drainage port. The upper cover plate 902 closes the lower casing 904 on the base 1. The lower casing 904 is fixedly welded to the inner side of the base 1. The lower casing 904 is provided with two inlet connectors 901, and the two inlet connectors 901 are connected to the drainage hose 8, respectively. The base 1 is provided with the first through hole 910 connected to the lower casing 904. The intermediate partition 903 is connected at the bottom of the upper cover plate 902 and divides the lower casing 904 into two parts: a first part and a second part. A gap with a height of H is formed between the intermediate partition 903 and the inner wall of the lower casing 904, so that the drilling fluid enters the first part from the inlet connectors 901, then enters the second part from the gap, and finally is discharged from the first through hole 910. The liquid baffle 906 is disposed at the first through hole 910. The liquid baffle 906 has an L-shaped cross-section, and is formed by a panel and a horizontal plate that is disposed horizontally. The panel of the liquid baffle 906 is attached to the first through hole 910. The panel of the liquid baffle 906 is provided with the second through hole 911 having a size small than the size of the first through hole 910. In the present embodiment, the first through hole 910 and the second through hole 911 are rectangular, and the height of the second through hole 911 is greater than H. The drilling fluid can enter the base 1 from the second through hole 911, and the bottom of the base 1 is provided with an outlet for discharging the drilling fluid. The wedge mount 905 is disposed at both sides of the first through hole 910 of the base 1, and the wedge mount 905 has a wedge groove that gradually narrows from the top end to the bottom end. Both sides of the liquid baffle 906 are clamped into the wedge groove of the wedge mount 905, respectively. The bottom end of the screw rod 907 is threadedly connected to the horizontal plate of the liquid baffle 906 and drives the liquid baffle 906 to move up and down. The top of the base 1 is provided with a through hole through which the screw rod 907 passes. The top end of the screw rod 907 is fixed on the base 1 through the nut 908 and the hand wheel 909. With this arrangement, the negative pressure automatic drainage device 900 has a large processing capacity.

The negative pressure shale shaker works in a negative pressure mode or a regular mode. The negative pressure fan 16 of the present embodiment may also adopt a vacuum pump. When the negative pressure fan 16 is started, the negative pressure shale shaker works in the negative pressure mode, the gas passes through the vertical channel, the horizontal channel, the vacuum hose 5 and the three-way pipe 11 and then is discharged through the liquid mist separator 12, and meanwhile, the drilling fluid passes through the screen 303 and the vacuum pan 10 and then is discharged into the negative pressure automatic drainage device 900 through the drainage hose 8. Specifically, the drilling fluid carrying the drill cuttings that flows out from a wellhead flows into a screening surface of the negative pressure shale shaker from the liquid inlet buffer tank 2. Under the action of vibration, a part of the drilling fluid passes through the screen 303 without negative pressure thereunder at an inlet port, and a part of the drilling fluid flows forward along the screening surface with the drill cuttings to enter the screen 303 with the vacuum pan 10 thereunder. Under the combined action of vibration and pressure difference, the drilling fluid and air on the screen 303 rapidly pass through the screen 303 and enter the vacuum pan 10, the air that has passed through the screen 303 in the vacuum pan 10 rapidly enters the vertical channel formed between the U-shaped vertical plate 305 and the right side plate 302 or the left side plate 311 from the holes on the right side plate 302 and the left side plate 311 of the screen frame assembly 300 due to the suction effect of the negative pressure fan 16, and then enters the liquid mist separator 12 through the horizontal channel formed by the U-shaped transverse plate 306 together with the right side plate 302 and the left side plate 311, the vacuum hose 5 and the three-way pipe 11. Liquid mist carried in the air is separated by the liquid mist separator 12 and then discharged from the drainage port of the liquid mist separator 12. The air purified by the liquid mist separator 12 enters the negative pressure fan 16 through the connecting pipe 13 and then is discharged into the atmosphere after passing through the silencer 15. The drilling fluid entering the vacuum pan 10 through the screen 303 is deposited at the lower side of the vacuum pan 10 due to gravity, and then is discharged through the drainage hose 8 by the negative pressure automatic drainage device 900. When the pressure of the inlet air of the negative pressure fan 16 is excessively low, the vacuum pressure limiting valve 14 is opened to ensure that a proper negative pressure is generated in the vacuum pan 10 under the screen 303, thereby preventing the drill cuttings from being adsorbed to the screen 303 due to the excessively large negative pressure such that they cannot be transported forward. When the negative pressure fan 16 is shut down, the negative pressure shale shaker works in the regular mode, and when the drilling fluid and the drill cuttings flow through the screening surface on which the vacuum pan 10 is installed, the drilling fluid passes through the screen 303 under the action of vibration and converges to the vacuum pan 10 due to gravity, and then is discharged into the negative pressure automatic drainage device 900 through the drainage hose 8. In this way, it is convenient for not only the rapid separation of solid-liquid or solid-liquid-gas, but also for switching in different working modes.

In summary, the negative pressure chamber formed in the vacuum pan is communicated through the U-shaped vertical plate and the U-shaped transverse plate. The U-shaped transverse plate is provided so that the drilling fluid can easily flow back. The gas and fluid are transported to the liquid mist separator through the vacuum hose and the three-way pipe. The gas is pumped out by the negative pressure fan. Meanwhile, the drilling fluid from which the drill cuttings have been screened out is collected by the drainage hose, a buffer is formed by the intermediate partition, and the channels for the drilling fluid are adjusted by the liquid baffle to control the automatic discharge of the drilling fluid. The negative pressure shale shaker combines the negative pressure generation and the gas-liquid separation to overcome the shortcomings that the liquid content of drill cuttings discharged by traditional shale shakers is high, the vacuum filtration-based drilling fluid solid-liquid separation equipment is expensive and has a short screen lifespan, and the gas-liquid separation system of existing negative pressure shale shakers is large in size and low in efficiency.

The above-described is merely the preferred embodiments of the present invention, and do not mean that these embodiments illustrate and describe all the possible forms of the present invention. Those ordinarily skilled in the art will be aware of that the embodiments described herein are used to help readers understand the principle of the present invention. It should be understood that the scope of protection of the present invention is not limited to such descriptions and embodiments. Those ordinarily skilled in the art can make other various specific transformations and combinations without departing from the substance of the present invention according to these technical teachings disclosed by the present invention, and these transformations and combinations shall fall within the scope of protection of the present invention.

What is claimed is:

1. A negative pressure shale shaker integrated with negative pressure generation and gas-liquid separation, comprising:
    a screen frame assembly,
    a liquid mist separator,
    a negative pressure automatic drainage device, and
    at least one vacuum pan;
    wherein
        the screen frame assembly is internally provided with at least one screen, and the screen frame assembly is installed on a base;
        the at least one vacuum pan is disposed below the screen frame assembly;
        the screen frame assembly is provided with at least one vertical channel, a horizontal channel and a connector, wherein the connector is connected at a middle portion of the horizontal channel;
        a bottom end of the vertical channel communicates with the at least one vacuum pan;
        the horizontal channel communicates with the vertical channel;
        the horizontal channel inclines downward from the connector, and a drilling fluid in the horizontal channel flows back to the vertical channel;
        the connector communicates with the liquid mist separator through a vacuum hose and a three-way pipe,
        the at least one vacuum pan and the negative pressure automatic drainage device are communicate through a drainage hose disposed between the at least one vacuum pan and the negative pressure automatic drainage device; and
        in the screen frame assembly, a lower side of the at least one screen is provided with a closed structure, the closed structure discharges the drilling fluid through the drainage hose, and a gas is discharged through the vertical channel;
        the negative pressure automatic drainage device comprises an inlet connector, an upper cover plate, an intermediate partition, a lower casing, a wedge mount, a liquid baffle with an L-shaped cross-section, a screw rod, a nut and a hand wheel; wherein
        the inlet connector is disposed on the lower casing;
        the upper cover plate closes the lower casing on the base;
        the intermediate partition is connected to a bottom of the upper cover plate, and the intermediate partition divides the lower casing into two parts;
        the base is provided with a first through hole connected to the lower casing;

a gap with a height of H is formed between the intermediate partition and an inner wall of the lower casing;

a panel of the liquid baffle is attached to the first through hole;

the panel of the liquid baffle is provided with a second through hole having a size smaller than a size of the first through hole;

a height of the second through hole is greater than the gap with the height of H between the intermediate partition and the inner wall of the lower casing;

the wedge mount is disposed at both sides of the first through hole of the base;

both sides of the liquid baffle are clamped into the wedge mount;

a bottom end of the screw rod is connected to the liquid baffle, and the bottom end of the screw rod drives the liquid baffle to move up and down; and a top end of the screw rod is fixed on the base through the nut and the hand wheel.

2. The negative pressure shale shaker of claim 1, further comprising a negative pressure fan and a connecting pipe connecting an inlet of the negative pressure fan and an outlet of the liquid mist separator; wherein a vacuum pressure limiting valve for adjusting a negative pressure is disposed on the connecting pipe, and a silencer is disposed at an outlet of the negative pressure fan.

3. The negative pressure shale shaker of claim 2, wherein the negative pressure shale shaker works in a negative pressure mode or a regular mode;

when the negative pressure fan is started, the negative pressure shale shaker works in the negative pressure mode, the gas passes through the vertical channel, the horizontal channel, the vacuum hose and the three-way pipe, and then the gas is discharged by the negative pressure fan through the liquid mist separator, and meanwhile, the drilling fluid passes through the at least one screen and the at least one vacuum pan, and then the drilling fluid is discharged into the negative pressure automatic drainage device through the drainage hose; and when the negative pressure fan is shut down, the negative pressure shale shaker works in the regular mode, and only the drilling fluid is discharged into the negative pressure automatic drainage device.

4. The negative pressure shale shaker of claim 1, wherein the at least one vacuum pan is connected to the negative pressure automatic drainage device through the drainage hose.

5. The negative pressure shale shaker of claim 4, wherein one vacuum pan is disposed under the at least one screen, and when a plurality of screens are provided, the plurality of screens share or each use one vacuum pan.

6. The negative pressure shale shaker of claim 1, further comprising a damping spring connected to the screen frame assembly.

7. The negative pressure shale shaker of claim 6, wherein the screen frame assembly further comprises a rear baffle, a right side plate, a transverse beam, a motor base, a vibration motor, a spring base, and a left side plate; wherein the rear baffle connects the right side plate and the left side plate;

the transverse beam connects the right side plate and the left side plate;

the motor base is fixedly connected to the right side plate and the left side plate, and the vibration motor is installed on the motor base; and the spring base is fixed to the right side plate and the left side plate.

8. The negative pressure shale shaker of claim 6, wherein a U-shaped vertical plate is connected to the right side plate or the left side plate to form the vertical channel, and a U-shaped transverse plate is connected to the right side plate or the left side plate to form the horizontal channel.

9. The negative pressure shale shaker of claim 2, further comprising a liquid inlet buffer tank and a support frame, wherein the liquid inlet buffer tank and the support frame are installed on the base; and an interior of the liquid inlet buffer tank communicates with an upper portion of the at least one screen, and the liquid mist separator and the negative pressure fan are installed at a top of the support frame.

* * * * *